Figure 1:
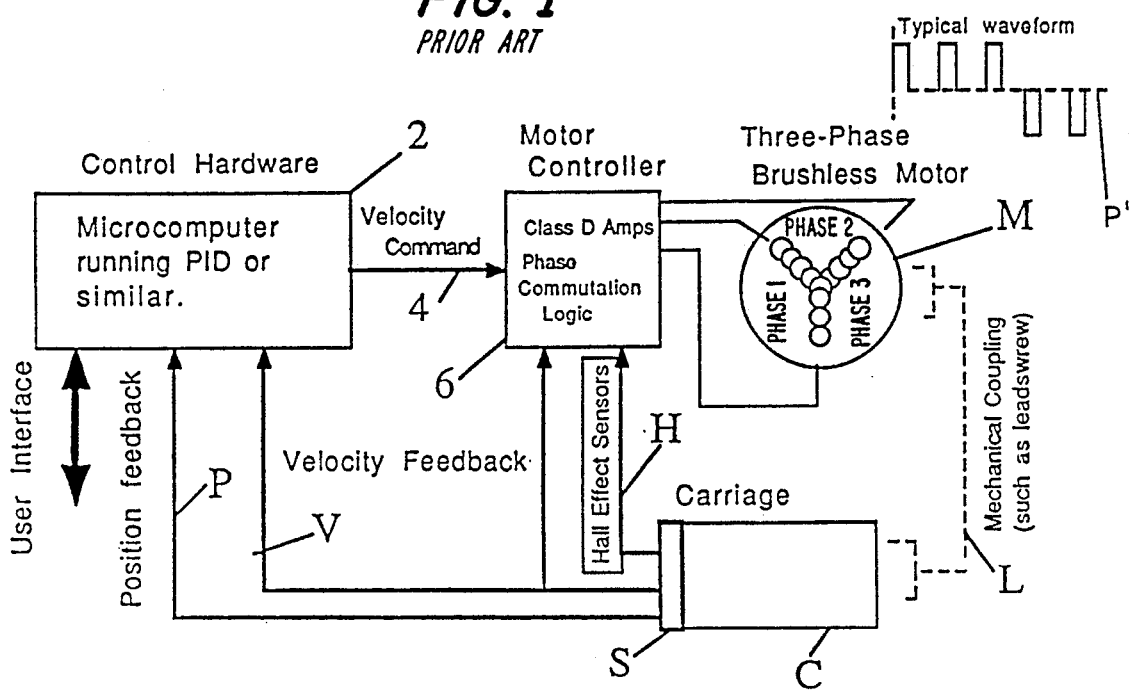

United States Patent [19]
Saidin et al.

[11] Patent Number: 5,023,528
[45] Date of Patent: Jun. 11, 1991

[54] METHOD OF THREE-PHASE WINDING MOTOR CONTROL OF ROTARY MOTOR-DRIVEN LINEAR ACTUATORS, LINEAR MOTOR-ACTUATED CARRIAGES, AND SIMILAR SYSTEMS, AND APPARATUS FOR PRACTICING THE SAME

[75] Inventors: Zain Saidin, Kailua, Hi.; Alexander H. Slocum, McLean, Va.

[73] Assignee: Advanced Engineering Systems, Operation & Products, Inc., Concord, N.H.

[21] Appl. No.: 263,502

[22] Filed: Oct. 27, 1988

[51] Int. Cl.$^5$ ............................................. H02K 29/02
[52] U.S. Cl. ..................................... 318/254; 318/439
[58] Field of Search .............. 318/500, 596, 615, 628, 318/254, 254 A, 661, 138, 139, 255, 616–618, 439, 611, 719, 721

[56] References Cited
U.S. PATENT DOCUMENTS

| | | | |
|---|---|---|---|
| 2,651,069 | 3/1987 | Pellegrini | 318/254 |
| 2,743,815 | 5/1988 | Gee et al. | 318/254 |
| 3,908,130 | 9/1975 | Lafuze | 318/254 AX |
| 3,932,793 | 1/1976 | Müller | 318/254 A |
| 3,979,651 | 9/1976 | Bringol | 318/254 A |
| 4,070,606 | 1/1978 | Morozumi et al. | 318/254 A |
| 4,415,844 | 11/1983 | Mendenhall et al. | 318/254 |
| 4,447,771 | 5/1984 | Whited | 318/661 |
| 4,622,500 | 11/1986 | Budelman, Jr. | 318/599 X |
| 4,814,677 | 3/1989 | Plunkett | 318/254 |

Primary Examiner—William M. Shoop, Jr.
Assistant Examiner—A. Jonathan Wysaki
Attorney, Agent, or Firm—Rines and Rines

[57] ABSTRACT

A motor controller for a three-phase rotary electric motor driving a leadscrew or linear electric motor actuated carriage or similar device and in which the controller generates periodic waveforms on all three phases that match the back-emf of the motor to enable smooth moving of the carriage with compensation for nonlinearities in motor parameters and carriage stiffness and damping.

10 Claims, 2 Drawing Sheets

METHOD OF THREE-PHASE WINDING MOTOR CONTROL OF ROTARY MOTOR-DRIVEN LINEAR ACTUATORS, LINEAR MOTOR-ACTUATED CARRIAGES, AND SIMILAR SYSTEMS, AND APPARATUS FOR PRACTICING THE SAME

The present invention relates to motor control techniques and apparatus for operating rotary electric motor driven linear actuators (e.g. leadscrew, capstan, or rack and pinion actuators) or linear electric motor actuated carriages or similar devices, responding to information from the user concerning desired positions, and generating therefrom velocity and/or torque signals to control a drive motor (heretofore usually a three-phase brushless DC motor) that moves the carriage or other device to such desired positions.

Virtually all conventional three-phase brushless DC motor control systems involve a motor controller that is completely separate from the system controller which receives the information from the user as to desired position of, for example, the carriage, as in a machine-tool or related application. Such information, along with position and velocity feedback signals fed to a microcomputer, produces velocity or torque (force) command signals in the form of analog voltages or digital numbers. The motor controller then attempts to move the motor carriage at that velocity or apply that torque (force) by pulse width modulation (PWM) signals applied to each of the three phases of such motor. The pulse width modulated signal is composed of short duration, high voltage pulses that intermittently or discontinuously effectively "hammer" the carriage to the desired position. Even though the intent is for the pulses to produce an averaging effect, the result is the generation of high frequency stress waves that makes their use unsuitable for systems with accuracies greater than about one micron. Distribution of the PWM signal to the three motor phases is controlled by the motor controller and the signals from Hall effect sensors that tell the motor controller where the windings are with respect to the magnets. The end result is the PWM waveforms look like square wave inputs to the motor coils; in addition the PWM signal imposes a high frequency signal on top of the square wave. The result is torque (force) ripple as high as 5-10% of the applied torque with an additional vibration at the PWM frequency. Note that if the PWM frequency is increased in an effort to get more accuracy through a greater amount of averaging, the high frequency pulses applied through the coils of the motor, cause the motor to act as an AM transmitter which tends to cause electromagnetic interference in other electronic devices in the area, thereby limiting system accuracy. One advantage of a PWM signal is that it will dissipate energy as an electromagnetic wave, while DC current will dissipate energy as heat. PWM is thus "nicer" to the structure of the motor because the thermal stresses are thus lower.

In accordance with the present invention, such PWM pulse control with its attendant discontinuous sequential "hammering" of the motor to the desired position is completely eliminated through novel use of a controller that generates waveforms on all three motor phases that match the back-emf of the motor with smooth, continuous, periodic waveforms. During coarse high speed moves, these continuous back-emf shaped waveforms could be pulsed with the use of a chopper amplifier to maximize power transmission efficiency and minimize heat introduced into the precision machine; however, when fine positioning moves with sub micron accuracy is required, little power is dissipated, the waveforms would not be chopped and would be applied in a smooth periodic fashion. Thus PWM induced radio frequency noise is eliminated during high accuracy moves.

The principal object of the invention, accordingly, is to provide such an improved motor controller integrated with the system controller, so the motor controller and system controller are now the same thing, thus voiding the "hammering" movement inherent in PWM velocity or torque control signals, providing, rather, smooth and continuous motor torque or force with close to zero torque or force ripple, and thus also improving the "tuneability" of the system making repair/replacement simpler.

Other and further objects will be explained hereinafter and are more particularly delineated in the appended claims.

In summary, from one of its viewpoints, the invention embraces a method of three-phase winding motor control of rotary electric motor driven linear actuators (e.g. leadscrew, capstan, or rack and pinion actuators) or linear electric motor actuated carriages or similar mechanically coupled system, that comprises, generating sinusoidal waveforms that approximate the ideal back-emf of the winding of the motor; generating a velocity or torque command signal in response to user desired location and the carriage position and velocity; and applying the back-emf sinusoidal shaped waveforms corresponding to two of the three phase windings of the motor and in response to such command signal to the respective two windings in order to effect application on all three phase windings of smooth, continuous periodic waveforms that match the back-emf of the motor, thereby smoothly moving the carriage with compensation for non linearities in motor parameters and carriage, stiffness and damping; whereby said signal can be chopped if desired for low thermal power dissipation during high speed low accuracy moves. Preferred and best mode details and embodiments are hereinafter described.

Figure 2:
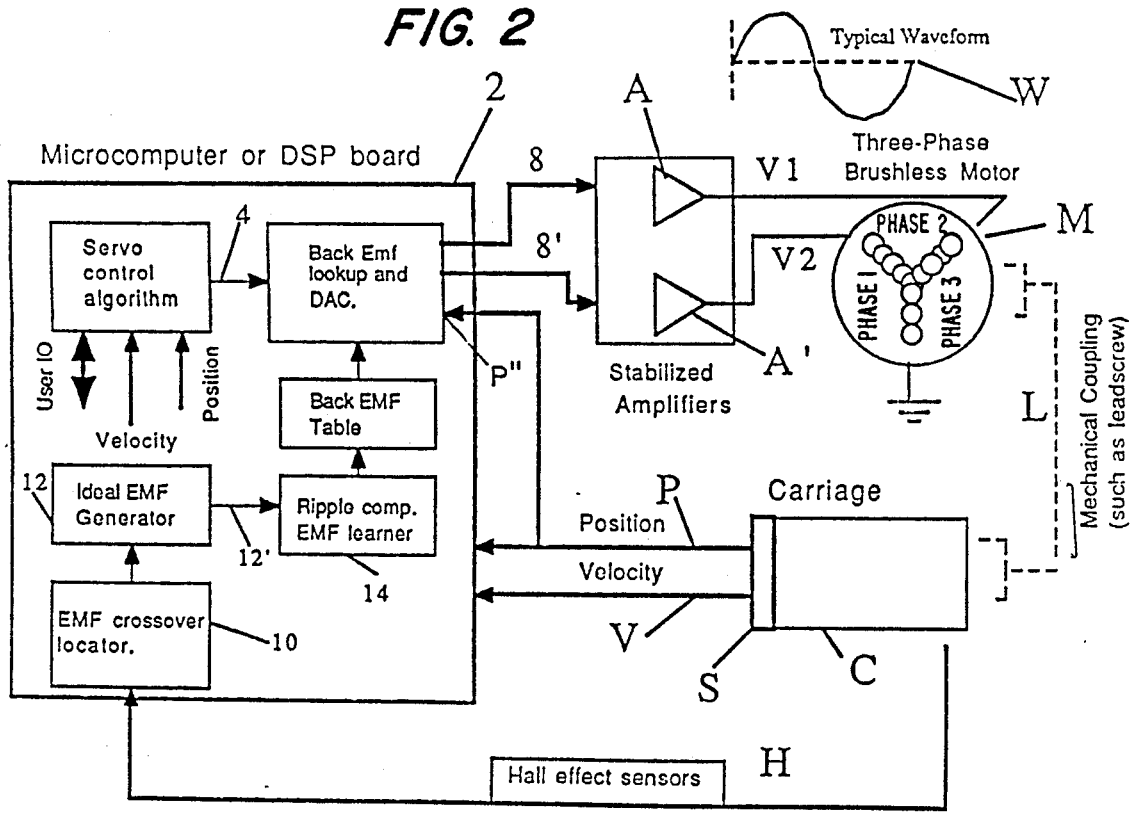
Figure 3:
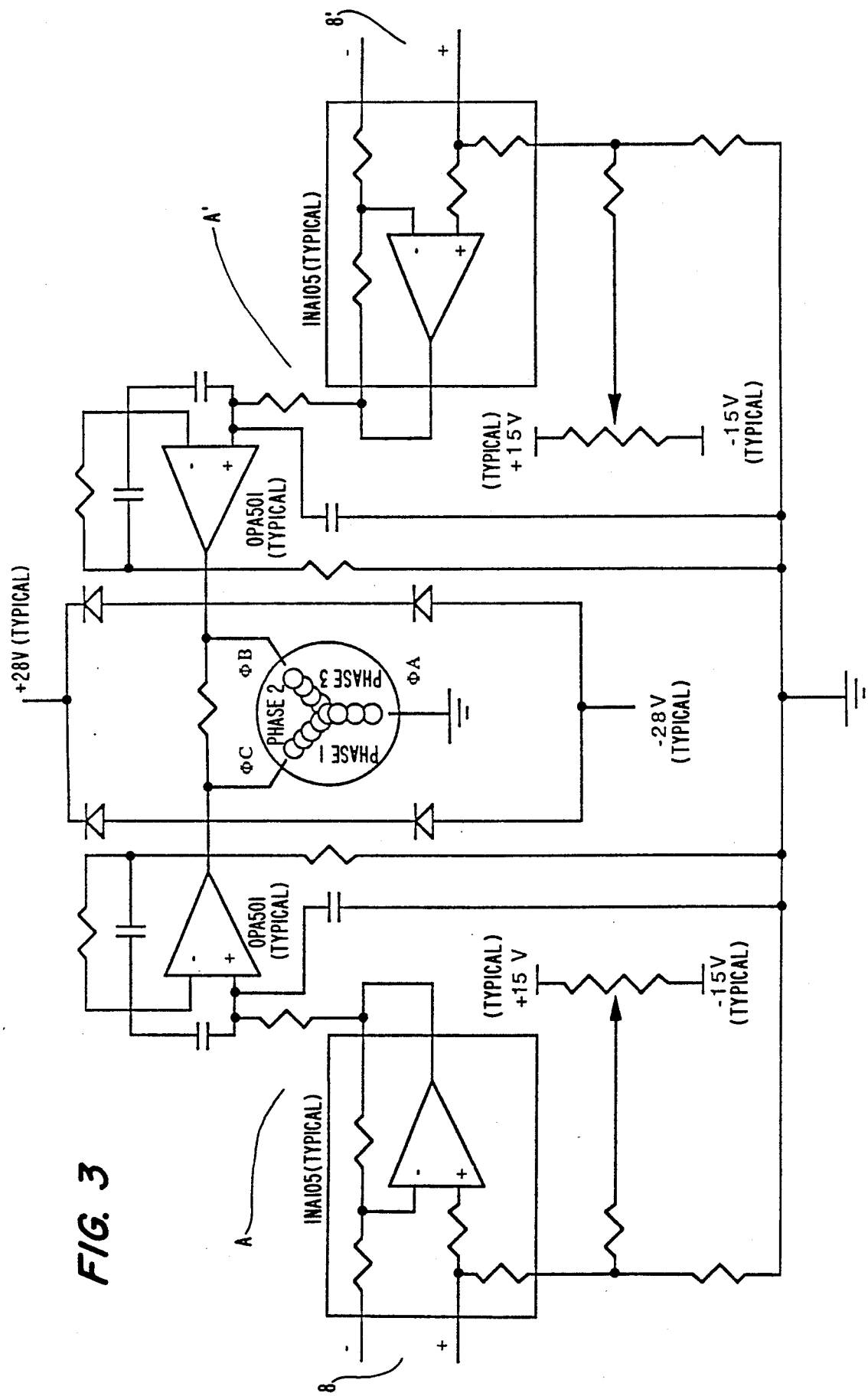

The invention will now be described with reference to the accompanying drawings, FIG. 1 of which illustrates a block diagram of the typical prior art PWM three-phase DC brushless motor control technique;

FIG. 2 is a similar diagram of the improvement of the present invention with smooth, continuous, periodic voltage waveforms; and FIG. 3 is a circuit diagram of a preferred stabilized amplifier for use in the circuit of FIG. 2.

Referring to FIG. 1, the typical prior-art three phase brushless motor M is shown with, for example, Y-type windings, developing Phase 1, 2 and 3, driving a leadscrew L coupled to a motor carriage C. The system controller receives information from the user ("User Interface") concerning desired position of the leadscrew L, applied to a microcomputer 2 together with carriage position and velocity feedback signals at P and V, respectively, and with the microcomputer running PID (proportional integral derivative control) or with similar well-known algorithm operation to produce a velocity or torque command signal (analog voltage or digital number) at 4, applied to the motor controller circuit 6, such as a Class D amplifier with phase communication logic for PWM signal generation, as is also well known. The feedback signals at P and V are generated by any of various types of sensors monitoring the carriage, also well known, such as, for example, laser interferometers, LVDT transducers, encoders, resolvers, at S. Generally, Hall-effect sensors H, mounted on the motor carriage C, apply to the motor controller 6 the correct polarity information for the PWM "hammering" high voltage, short duration pulses (shown at P', upper right) that discontinuously move the motor carriage C in response to the PWM signal P' applied to each of the three phase windings.

As before stated, the present invention obviates this "hammering" pulse discontinuous movement operation and the torque or force ripple consequences of using a square wave applied to the coils. Instead of using PWM (on-off) signals P thus to "hammer" the motor to the desired position, the motor controller of the present invention, as shown in FIG. 2, generates waveforms applied on all three phase windings (Phase 1, 2, and 3) of the brushless motor M, that match the back-emf of the motor—smooth, continuous, periodic waveforms (sinusoidal or near sinusoidal as they must compensate for non-linearities) W, as shown at the far right in FIG. 2 that, as before stated, enable the smooth moving of the carraige C, compensating for non-linearities in motor parameters, etc., both in cases requiring high speed accuracy motion and low accuracy motion without vibration or other interference. Within the microcomputer or digital signal processor (DSP) board of FIG. 2, the servo control algorithm (such as the before-mentioned basic PID, for example) operates upon user input as to desired location ("User IO") and velocity and position feedback signals V and P from carriage feedback signal sensors S, as in the system of FIG. 1, to pass a velocity command signal at 4 to a back-emf routine ("Back Emf"). The Back Emf routine, in turn, then obtains the appropriate signal value for two of the three phases—say $V_1$ for Phase 1 and $V_2$ for Phase 3—the third phase (Phase 2) being automatically then determined and dependant upon the first two (i.e. $V_2$ and $V_1$). In a motor M wound for 60-degree phase shift, the voltage on the implied phase will have the proper phase alignment. The values $V_1$ and $V_2$ are scaled by the velocity (or torque) command signal at 4 and sent at 8 and 8' via stabilized amplifiers A and A' to the respective phase windings. For low thermal power dissipation, low accuracy moves, the signal could be chopped with a chopper amplifier or modulated in software if suitable amplifiers are used prior to entering the motor windings. The signal contains all information including modulation. For high accuracy moves, the continuous signal would be sent to the motor windings.

Generation of the back-emf shaped waveform W is a three-step process. First, since the back-emf is a function of the motor coil (rotor) position relative to the magnets (magnetic windings) and speed, with nodes at magnetic nodes, the Hall-effect sensors H are used to map the locations of the magnetic cycles, controlling the EMF crossover location at 10. (The "Back-Emf" is stored as a function of position at P"). Next, an "ideal" EMF generator 12, with crossover set by the output of 10, creates a properly aligned sinusoidal waveform at 12' to approximate the back-emf. Speed is irrelevant since position lookup rate is proportional to speed. Finally, the sinusoid is modified by a ripple compensating "EMF learner" routine 14 that takes the measured ripple (from differentiating the position signal or through the use of an accelerometer) and uses it for such modification, feeding the same in the "Back EMF" routine to enable the application of 8 and 8', and through stabilized amplifiers A and A', of the smooth, continuous waveforms W on all three motor winding phases—compensated for nonlinearities in motor parameters and carriage stiffness and damping and thus enabling the before-mentioned smooth carriage movement. A suitable stabilized amplifier A is shown in FIG. 3 wherein an operational amplifier type OPA 501 is used to apply the back-emf shaped waveform to the upper left terminal of the Y winding at $\phi_c$ of the motor M. The end result is that a map is created of the ideal waveform to send to each of the motor coils; the map being a function of rotor position and speed ranges. Hence torque in a rotary motor or force in a linear motor can be generated with virtually zero ripple.

Further modifications will also occur to those skilled in the art and such are considered to fall within the spirit and scope of the invention as defined in the appended claims.

What is claimed is:

1. A method of control of a rotary electric motor having three phase windings and driving a linear actuated carriage, that comprises, generating sinusoidal waveforms that approximate the ideal back-emf of the said windings of the motor; generating a velocity or torque command signal in response to user desired location and the position and velocity of said carriage; and applying the back-emf shaped sinusoidal waveforms corresponding to two of the three phase windings of the motor and in response to such command signal to the respective said two of the windings in order to effect application on all three phase windings of smooth, continuous periodic waveforms that match the shape of the back-emf of the motor at the desired motor speed, thereby smoothly moving the said carriage with compensation for nonlinearities in motor parameters and stiffness and damping.

2. A method of three-phase winding motor control as claimed in claim 1 and in which said periodic waveforms are chopped prior to entering said motor windings to permit low thermal power dissipation during high speed low accuracy motion, and said periodic waveforms are applied directly to said motor windings to permit high accuracy motion without generating high frequency mechanical vibration or large amounts of electromagnetic interference.

3. A method of control of an electric motor having three phase windings and driving a linear actuated carriage, that comprises, continuously sensing the position and velocity of the said carriage and of the motor position; generating command signals in response to user desired location and the sensed said position and velocity of the carriage; generating sinusoidal waveforms to approximate the ideal back-emf shape of the windings of the motor with appropriate cycle and emf crossover setting in response to the sensed motor position; modifying the said sinusoidal waveforms with measured velocity ripple at a particular velocity; and applying such modified back-emf sinusoidal waveforms in response to said command signals to produce back-emf signals for two of the three phases of the motor windings, thereby generating a map of an ideal waveform as a function of said position and velocity to create force without ripple; and applying the waveforms to said two windings of the motor to effect application on all three phase windings of smooth, continuous periodic waveforms that match the back-emf of the motor, thereby smoothly moving the said carriage with compensation for nonlinearities in motor parameters and carriage stiffness and damping.

4. A method as claimed in claim 3 and in which said periodic waveforms are modulated with on-off modulation prior to entering said motor windings to permit low thermal power dissipation during high speed low accuracy motion, and said periodic waveforms are applied directly to said motor windings to permit high accuracy motion without producing high frequency mechanical vibration or large amounts of electromagnetic interference.

5. A three-phase winding motor controller of an electric motor having three phase windings and driving a linear actuated carriage, having, in combination with the motor, carriage and coupling therebetween, means for generating periodic waveforms that approximate the ideal back-emf of the windings of the motor; means for continuously sensing carriage position and velocity; computer means responsive to user desired location input and to the sensed carriage position and velocity for generating command signals; and means, responsive to said command signals, for applying the said back-emf periodic waveforms corresponding to two of the three phase windings of the motor to the respective said two windings in order to effect application on all three phase windings of smooth, continuous, periodic waveforms that match the shape of the back-emf of the motor, thereby smoothly moving the said carriage with compensation for nonlinearities in motor parameters and carriage stiffness, and damping.

6. Apparatus as claimed in claim 5 and in which there is provided means for chopping said periodic waveforms prior to entering said motor windings to permit low thermal power dissipation during high speed low accuracy motion, and means for directly applying said periodic waveforms to said motor windings to permit high accuracy motion without producing high frequency mechanical vibration or large amounts of electromagnetic interference.

7. Apparatus as claimed in claim 5 and in which means is provided for sensing motor position and for setting the generated periodic waveforms at approximate cycle and emf cross-over locations in response thereto.

8. Apparatus as claimed in claim 5 and in which means is provided for modifying the generated back-emf shaped periodic waveforms in accordance with measured velocity ripple to generate a map of the ideal waveforms as a function of said position and velocity required to be applied to the motor windings to generate ripple-free force.

9. A motor controller for one of a three-phase winding rotary brushless electric motor and a linear electric motor having three phase windings and linearly actuating a carriage, having, in combination, means for generating periodic waveforms on all three phases of the motor that respectively match the back-emf of the motor, and means for applying said waveforms to the respective windings of the motor to enable smooth movement with compensation for nonlinearities in motor parameters and carriage stiffness and damping.

10. A motor controller as claimed in claim 9 and in which means is provided for chopping the said waveforms before application to said windings during high speed low accuracy motion, and means for directly applying the waveforms for high accuracy motion.

* * * * *